Nov. 20, 1962 — C. E. GRINSTEAD — 3,064,893
COUNTER
Filed March 13, 1958 — 3 Sheets-Sheet 1
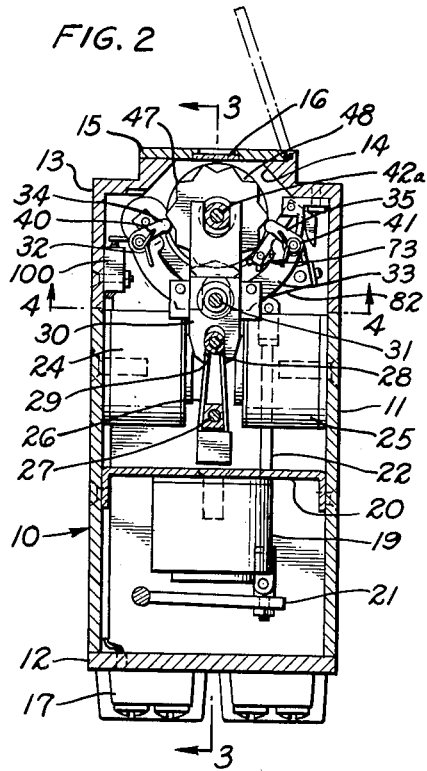
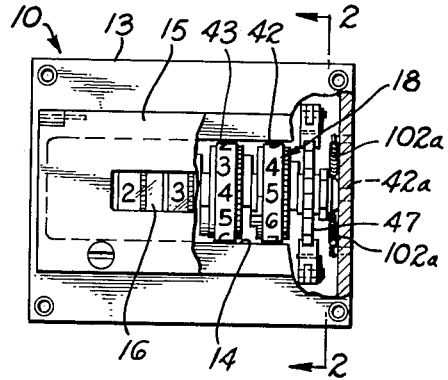
INVENTOR.
CARL E. GRINSTEAD
BY
D. Gordon Angus
ATTORNEY Nov. 20, 1962     C. E. GRINSTEAD     3,064,893
COUNTER
Filed March 13, 1958     3 Sheets-Sheet 2
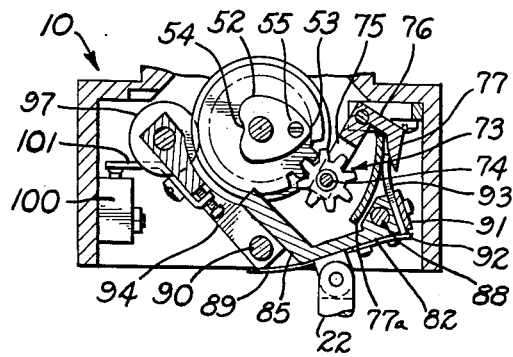
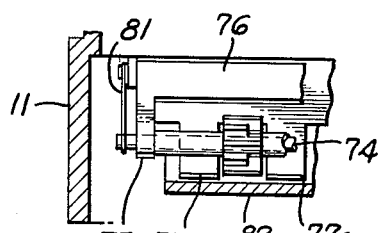
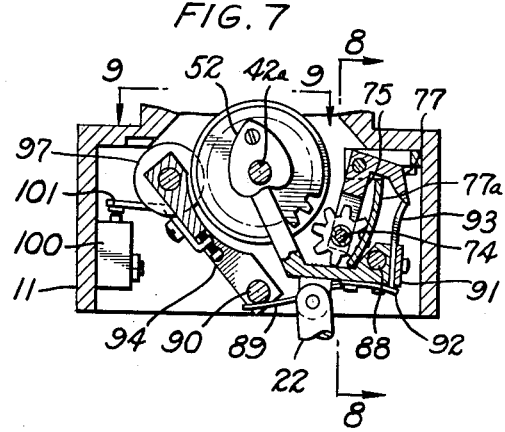
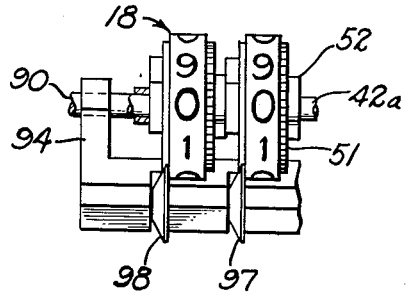
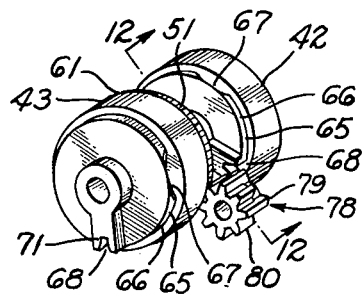
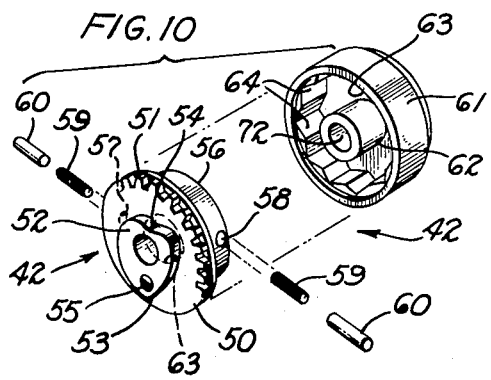
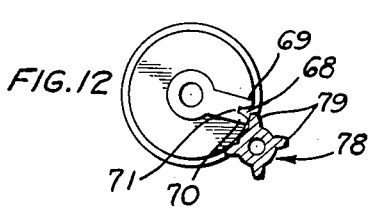
INVENTOR.
CARL E. GRINSTEAD
BY
D. Gordon Angus
ATTORNEY Nov. 20, 1962    C. E. GRINSTEAD    3,064,893
COUNTER
Filed March 13, 1958    3 Sheets-Sheet 3

INVENTOR.
CARL E. GRINSTEAD
BY
D. Gordon Angus
ATTORNEY

United States Patent Office 3,064,893
Patented Nov. 20, 1962

3,064,893
COUNTER
Carl E. Grinstead, 3190 San Pasqual, Pasadena, Calif.
Filed Mar. 13, 1958, Ser. No. 721,135
4 Claims. (Cl. 235—132)

This invention relates to a counter which has a datum level, and which can be preset to any desired predetermined level relative to its datum level, and which can be reset to that predetermined level.

There are many counter applications where it is desired to count from some predetermined level. In such applications, it is advantageous to have means for easily setting that predetermined level in the counter, and means for quickly resetting the counter to that level.

As a part of a counter which counts relative to a predetermined level, it is frequently desired to have some datum level, such as zero, from which the predetermined level differs by the value of the predetermined level, and to have means for indicating the fact of a count past the datum level.

According to this invention, a counter has a plurality of counting wheels which are connected through transfer mechanisms which advance a succeeding counting wheel by one unit of its counting radix as a result of a full revolution of a preceding counting wheel.

Each counting wheel is made of two portions, the portions being linked by yielding means which cause the two portions to rotate together in response to counter actuations, but which can be overcome by sufficient counter rotative torque so that the two portions can be rotated relative to each other. One of the portions carries indicia of numerals, while the other portion bears a reset cam for returning the counting wheel to a predetermined level.

A preferred but optional feature of the invention resides in providing each counting wheel with means for indicating when that wheel is at its own datum level. Ganged means are also provided which are responsive as a unit to the position of all of the counting wheels. In the preferred embodiment, each counting wheel has a datum level notch in a peripheral ring, and the ganged means is a single pivoted bar which rides along all of the rings. When any counting wheel is off of the datum position, the ganged means is held in a first position. When all wheels are in the datum position, at which time all notches are aligned adjacent to the ganged means, the ganged means can assume a second position. Movement of the ganged means between these two positions can actuate a switch for indicating whether or not the device is at its datum level.

The above and other features of this invention will be fully understood from the following detailed description and the accompanying drawings of which:

FIG. 1 is a top view, partly in cut-away cross-section, of a device according to the invention;

FIG. 2 is a cross-section taken at line 2—2 of FIG. 1;

FIG. 3 is a cross-section taken at line 3—3 of FIG. 2;

FIG. 4 is a cross-section taken at line 4—4 of FIG. 2;

FIG. 5 is a fragmentary cross-section taken at line 5—5 of FIG. 3;

FIG. 6 is a fragmentary cross-section taken at line 6—6 of FIG. 4;

FIG. 7 shows the portion of the device illustrated in FIG. 6 in a different operative position;

FIG. 8 is a fragmentary detail of a transfer mechanism, taken at line 8—8 of FIG. 7;

FIG. 9 is a fragmentary view, partly in cut-away cross-section, taken at line 9—9 of FIG. 7;

FIG. 10 is an exploded view of one of the counting wheels shown in FIG. 1;

FIG. 11 is a perspective view of a pair of adjacent counting wheels showing their interconnecting transfer mechanism;

FIG. 12 is a cross-section taken at line 12—12 of FIG. 11;

Figure 13:
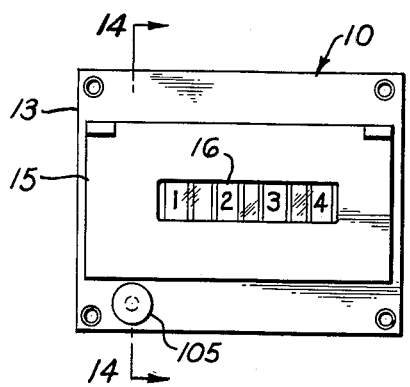
FIG. 13 is a top view of another embodiment of the invention.

A counter 10 according to this invention is shown in FIG. 1 which is enclosed in a case having a base section 11, end closure 12, and a cap section 13. The cap section 13 is provided with an opening 14 which opening is covered by a hinged lid 15. The lid has a transparent window 16. As shown in FIG. 2, the lid can be lifted to expose a portion of the internal mechanism of the counter, and can be lowered to enclose the mechanism, still leaving portions of it visible through the transparent window.

The end closure 12 is provided with an insulated terminal member 17, which has terminal connections for connecting leads to the various electrical components of this counter, which will be more fully disclosed below.

The counter includes a counting train 18. Means for powering the actuation of the counting train and for resetting it are contained in the base section 11. Two reset solenoids 19 are attached to a base plate 20 which extends across the inside of the base section. A hinged reset actuator plate 21 is pivoted to the base section, and its free end is pinned to a reset rod 22, the rod passing through a passage 23 in base plate 20. Two pairs of counting solenoids 24, 25 are mounted to the base section of the case. Counting solenoids 24 are "add" solenoids, and counting solenoids 25 are "subtract" solenoids. The counting solenoids are opposite from each other in the case, and their magnetic forces are opposite in direction. An armature 26 is mounted between the solenoids 24 and 25 by a pivot shaft 27. The armature is made of magnetizable material. It can be drawn toward either of the counting solenoids when that solenoid is actuated.

The armature has a bearing 28 at its free end, which bearing fits inside a notch 29 in a yoke 30. Yoke 30 is mounted to a shaft 31, which shaft is mounted to the side wall of the cap section of the case. It will be seen that the yoke is adapted for arcuate motion in response to the tilting movement of the armature 26. The yoke has a pair of ears 32, 33. Each of these ears bears a pawl 34, 35 and a stop 36, 37 respectively. The pawls 34 and 35 are pivotally mounted to the yoke by pins 38, 39 respectively, and the pawls are biased inwardly by springs 40, 41 respectively, which springs are opposed between the yoke and respective pawl. It will be seen that tilting of the yoke in response to armature movement will cause one of the pawls to be withdrawn from the counting train while the other pawl will move into contact therewith to rotate one of the counting wheels.

The three sets of solenoids are provided with leads which are connected to terminals on the insulated terminal member 17.

The counting train itself will now be described. A counting wheel shaft 42a (see FIG. 1) is journaled in opposite sides of cap section 13. Shaft 42a passes through a central opening in each one of a plurality of individual counting wheels 42, 43, 44, 45. A spring 46 (see FIG. 3) loads the counting wheels toward one end of the shaft. A ratchet wheel 47 is also mounted on shaft 42a, which wheel is pinned to the right hand counting wheel 42. Ratchet wheel 47 is provided with a number of notches 48 to receive the pawls and stops, so that the initial counting wheel 42 is rotated by actuations of armature 26.

The detailed construction of counting wheel 42 is best shown in FIG. 10. In will be understood that counting wheel 42 is exemplary of all of the counting wheels in this counter. Counting wheel 42 has a driven portion 50 which is provided with a continuous driven gear 51. Driven gear 51 is unused in counting wheel 42, the ratchet wheel 47 serving as a driven gear for this wheel. However, the presence of gear 51 on wheel 42 does no harm, and it does permit all counting wheels to be alike. In wheels 43–45, the driven gear 51 receives the actuation for rotating the wheel. A heart-shaped reset cam 52 has a point 53 and a notch 54 on the non-circular periphery of the cam. The cam is pierced by the counting wheel shaft, and is pinned to the counting wheel's driven portion by pin 55.

The driven portion has a circular cylindrical section 56. Two recesses 57, 58 are drilled into the cylindrical section 56. Each recess receives a bias spring 59 and a ratchet pin 60.

The other part of the counting wheel 42 is a follower portion 61 which has a tubular bushing 62 in its hollow center. The bushing is adapted to enter and fit snugly within an opening 63 in the driven portion. Surrounding this bushing, and within the follower portion 61, there are ten ratchet notches 64, which ratchet notches are evenly spaced around the bushing and are adapted to receive the spring-loaded ratchet pins 60 so as to hold the follower portion to the driven portion for mutual rotation under normal driving forces on the counting train. The ratchet notches 64 are somewhat shallow, and when counter-rotative forces of sufficient magnitude are exerted between the follower portion and the driven portion, then the two counting wheel portions can be rotated relative to each other. The ratchet pins and ratchet notches thereby provide yieldable means which normally hold the two counting wheel portions together for mutual rotation, but which can be overcome to rotate one portion relative to the other.

FIG. 11 shows the back side of the follower portion 61 of counting wheel 42. On this side, the follower portion is provided with a circumferential ring 65, which has a smooth shoulder 66. This shoulder is interrupted at one point by a zero level notch 67, and at another point by a transfer indexing notch 68. The indexing notch is disposed between the teeth 69, 70 of a transfer indexing gear 71 which is preferably molded integral with the follower portion 61. The follower portion has a hole 72 passing through said bushing to pass the counting wheel shaft 42a.

Transfer gearing 73 (see FIG. 6) is fitted to a transfer gear shaft 74. This shaft is held at its two ends by lever arms 75. These levers are extensions from a pivotable bar 76. The bar is mounted in the cap section, and has a finger 77 that is adapted to be contacted by an extension of the reset mechanism, as will be set forth in detail below. The finger 77 serves to retract the transfer gear shaft away from the counting train when the train is being reset. A positioning stop 77a is spaced from the counting train by a distance such that just before the transfer gears are out of mesh with the counting wheels, they are in line with the stop. This prevents the transfer gears from turning when the transfer gear shaft is moved toward or away from the counting wheels.

A single transfer gear 78 is shown in detail in FIG. 11, it being understood that there is a similar one of these transfer gears between each pair of adjacent counting wheels. Transfer gear 78 can be made by modifying an eight-tooth pinion gear by milling off an end section of four alternate teeth. This leaves four long teeth 79 which extend the full length of the gear, and four short teeth 80, which extend only part of the length of the gear. The left hand portion of the full teeth as shown in FIG. 11 continuously engages the continuous drive gear 51 of one of the counting wheels, while the other end of the full teeth engages between the teeth 69 and 70, and enters notch 68 when they register with the transfer gear. Teeth 69 and 70 engage two short and one long gear each time they register with the transfer gear. After the teeth 69 and 70 are past the transfer gear, then a pair of long teeth straddle the circular ring 65 and cannot turn until the teeth 69 and 70 again reach a full tooth.

The transfer gears 78 are spaced from each other on the transfer gear shaft 74 by spacers and are rotatable independently of each other. The transfer gear shaft is biased by a spring 81 toward the counting wheels so that the transfer gearing is held in position for proper meshing with the counting wheels.

A reset bar 82 having depending reset fingers 83, 84, 85, 86 is mounted to a shaft 88. Shaft 88 is journaled in the side walls of the cap section. Each reset finger is opposed to a respective one of the heart-shaped cams. A leaf spring 89 which bears against a support 90 that is mounted to the cap section biases the reset bar so that the reset fingers are moved away from the heart-shaped cams. On the side of the reset bar adjacent finger 77 on bar 76, there is a plate 91 and a backing strip 92 which position holds a depending element 93 that bears against finger 77. When the reset solenoid is actuated, the reset bar 82 is moved away from the solenoid against the restoring force of leaf spring 89, and the reset fingers are moved against the cam. At the same time, element 93 bears against the finger 77 so as to retract the transfer gear shaft 74 away from the counting wheel.

To the support 90 there is pivotally mounted a zero level gang bar 94. This gang bar carries discs 95, 96, 97, 98, one for each of the counting wheels. The discs ride along the rings 65, one disc on the ring of each counting wheel. Whenever any of these discs rides on the unnotched periphery of the ring, then none of the discs can enter the zero level notch 67, even if all except one are at a zero level notch, because the discs are ganged. However, when all of the zero level notches are lined up opposite the discs, which occurs at the unique datum level, which is zero in this structure, then all of the discs enter the respective zero level notches at once, and the gang bar accordingly changes its position. The zero level gang bar therefore has two unique positions, one position is occupied when the number indicated by the counter is at any value other than the datum level, the second position is occupied only when all of the counter wheels are at datum level.

A micro-switch 100 is mounted to the wall of the cap section and has its contact spring contacted by an extension 101 of the zero level gang bar. The micro-switch is in one switching position for any number other than datum level and is in another switching position for the datum level. Whether the switch is on or off at the datum level is merely a matter of choice. Leads from the micro-switch are connected to the insulated terminal member 17. The switch comprises an indicating means for signaling whether the device is at zero level or not.

A detent 102 engages ratchet wheel 47 to hold the counting wheel 42 at the angular position to which the pawls move it. It is held in position by springs 102a.

The operation of this device will now be described. Initially it may be desired to count a number of pulses equal to some predetermined level, say 521, which is a number selected at random. Any other number within the capacity of the counting train could have been selected. The lid 15 will be lifted and the reset solenoid will be held actuated. At this time, the follower portion of the individual counting wheels can be turned so as to indicate the number 521. The purpose of holding the reset solenoid actuated is because the reset fingers will be pressed against the heart-shaped cams so as to hold the driven portion of the wheels against rotation, and the transfer gearing is withdrawn so that the follower portions can be rotated independently of the gearing. The spring force of springs 59 can be overcome at this time in order to set the follower portion of the counting wheels at the predetermined level. Actuating the reset solenoid at this time also returns all of the heart shaped cams and the connected driven portions of the counter wheels to a unique position where all of the cams are lined up. It will now be seen that if the counter is actuated by a number of counts such that it reads any number except 521, then when the reset solenoid is again actuated, the heart-shaped cams will again be lined up to this unique position and the counter will be reset at the number 521. This feature renders the device presettable to a predetermined level so that it can be reset to said level whenever desired.

It may be desired to indicate when some predetermined number of pulses has been provided to this counter. The datum or zero level control is provided for this purpose. It will be noted that the zero level notches are all disposed in corresponding locations relative to numerals on the follower portion of the counting wheels. They will all be lined up when the counter reads zero. Therefore, if the initial predetermined level of this counter is 521, then when the number of actuations of the subtract solenoid exceeds the number of impulses of the addition solenoid by 521, the counter will read zero, and the zero level gang bar will move toward the counting wheels because of the ability of all of the discs to move into the notches at once. The micro-switch condition will then be changed during the time when the device remains at zero.

It will be understood of course that this device can be made solely additive by providing (or activating) only an addition solenoid, or solely subtractive by providing (or activating) only a subtractive solenoid, or can be made both additive and subtractive as shown by providing and activating two solenoids.

Figure 14:
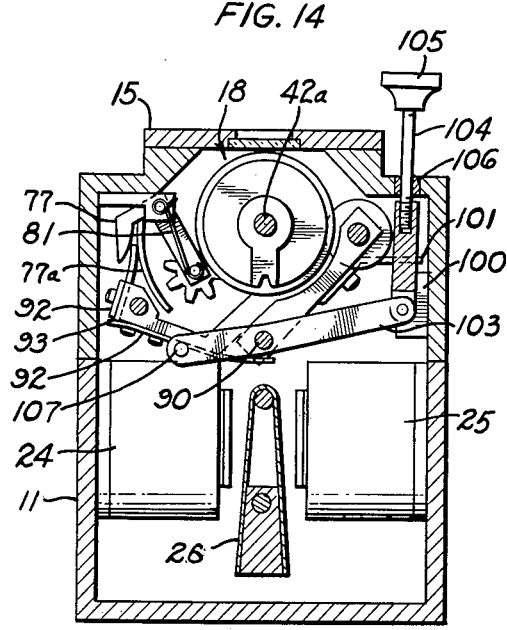
FIG. 14 is a cross-section taken at line 14—14 of FIG. 13.
Figure 16:
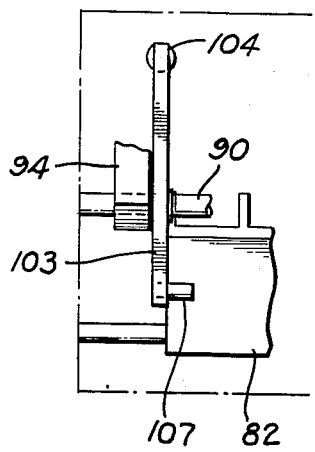
FIG. 16 is a fragmentary cross-section taken at line 16—16 of FIG. 15.
Figure 15:
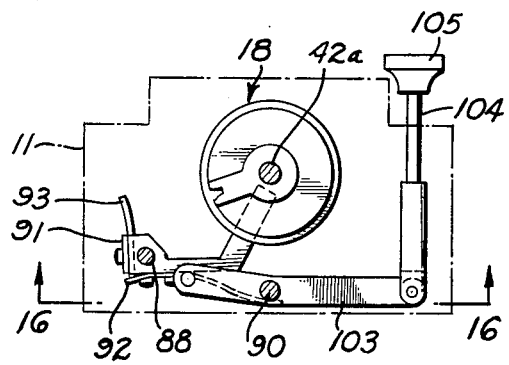
FIG. 15 shows a portion of the device illustrated in FIG. 14 in another operative position.

FIGS. 13–15 show mechanical means for resetting this counter. As noted above, the device is reset by moving the reset bar. As best shown in FIG. 14, this result may be obtained manually by pivotally mounting to support 90 a reset lever 103 which is pinned to a vertically reciprocable push rod 104 having a button 105 on its end outside the case. The push rod passes through a bushing 106 in the case.

At the other end of the lever from the push rod there is a transverse pin 107 which rests against and beneath the reset bar. Forcing the push rod downward in FIG. 14 moves the transverse pin up, thereby moving the reset bar in an upward direction for resetting purposes.

The operation of the counter of this invention will be evident from the drawings and from what has been set forth above, so it will be recapitulated only briefly. With respect to the embodiment shown in FIGS. 1 through 12 inclusive, the device is first preset to a predetermined numerical level by actuating the reset solenoids 19 which elevates the free end of plate 21 (see FIG. 3) thereby tilting the reset bar 82 around its pivot so as to force the reset fingers against the heart-shaped cams. This action of the fingers moves all of the heart-shaped cams simultaneously to the position shown in FIG. 7. Each cam has a noncircular periphery with a unique point closest to its rotational axis. Its associated finger tends to turn the cam until it contacts this point. Because the cams are all pinned to a driven portion of the counting wheels, actuation of the reset numeral will always return all of the driven portions of the wheels to a unique position. Holding the solenoid actuated keeps all of the cams aligned in this position.

Tilting of the reset bar also causes the element 93 to bear against fingers 77 so as to retract the transfer gear shaft 74 and all of the transfer gearing away from the counting wheels. This action leaves the follower portions free to be rotated relative to the driven portions upon overcoming the force of the bias spring 59 and ratchet pin 60. At this time the lid can be lifted, and with the fingers the follower portions can be turned by hand by exerting sufficient counter-rotative force on the follower portion to overcome the yielding means comprising spring 59 and pin 60. The counter-rotative force is exerted by the hand on the follower portion and by the reset fingers on the driven portion. The follower portions can now be set to any desired numerical position. Thereafter, the reset solenoid can be de-energized, and the reset bar will be restored by spring to an unactuated position, wherein the transfer gearing engages the counting wheels and the reset fingers are withdrawn from the periphery of the cams. The device is now preset to a predetermined numerical level.

Each counting wheel has a radix, which in the example given is 10. It will be understood that radices other than 10 can be used, and that the radices of all of the wheels do not have to be the same. In any event, each wheel rotates one full revolution on the counting wheel shaft in response to a number of unit actuations equal to the radix of the particular wheel; that is to say, a unit actuation of the wheel turns the counting wheel through an angle equal to 360° divided by the radix of the particular wheel. To obtain this result, it is merely necessary to properly select the transfer gear ratios.

The counting wheel of least numerical order, counting wheel 42, receives its unit actuations from actuation of the ratchet wheel 47. It will be understood that counting wheel 42 is adapted to be driven more or less continuously, while the counting wheels of ascending numerical order 43, 44 and 45, receive a single unit actuation as a consequence of a full revolution of the preceding counting wheel.

After the device has counted in either direction from the predetermined level by virtue of energization of the add or subtract solenoids which pivot the armature 26 from side to side to cause the pawls to turn ratchet wheel 47 for this purpose, the device may be reset to the predetermined level simply by energizing the reset solenoid so that the reset fingers again return all the cams to the position shown in FIG. 7. This returns the counting wheels to the predetermined numerical level.

The zero level notches are placed on the portion of the counting wheels which do not bear cams, in the example shown, on the follower portions. The notches are associated with the numerical indicia and all are similarly placed with respect to zero. Accordingly, these notches will all be aligned when the indicated number consists of a number of like digits. More particularly when the numeral zero appears in the top window, all of the zero level notches are aligned adjacent to the discs on the gang bar and the zero level gang bar can move to a position which it can keep only when all the zero level notches are in this one unique position. At this time, the microswitch 160 changes its position and indicates the passage through zero of the counter. At any other number, the gang bar is moved to its other position, because at least one of the discs is out of its associated notch and riding the shoulder 66.

The operation of the counter shown in FIG. 14 is similar to that shown in FIGS. 1 through 12 except that the reset mechanism is actuated by pressing button 105 downward where it serves to rotate the reset bar in the same direction and sense as was done by the reset solenoid in FIGS. 1 through 12. All other actions are the same. This counter does not require a reset solenoid.

This device provides a counter which can conveniently be preset to a predetermined numerical level and which can easily be reset to said predetermined numerical level and which can give an indication of passage through a zero level.

This invention is not to be limited by the embodiment shown in the drawings and described in the description,

I claim:

1. A counter comprising: a case, a counting wheel shaft mounted to the case and disposed inside the same, a plurality of counting wheels rotatably mounted upon said shaft, each counting wheel having a radix and being rotatable through one full revolution in response to unit actuations equal in number to its radix, a unit actuation thereby turning said counting wheel through an angle equal to 360° divided by its radix, a transfer gearing shaft, an arm pivotally mounted to the case and supporting said transfer gearing shaft so it is movable toward and away from the counting wheels, gear teeth on said counting wheels, a plurality of transfer gears rotatably mounted on said transfer gearing shaft and engageable with the gear teeth on the counting wheels, one of said gears interconnecting a pair of adjacent counting wheels for providing a unit actuation to one wheel of said pair of counting wheels as a consequence of one full revolution of the preceding counting wheel, each counting wheel comprising a driven portion and a follower portion, said portions being coaxially disposed for rotation about the counting wheel shaft, yielding means joining said portions for mutual rotational motion in response to torque exerted on one of said portions, said yielding means permitting counter-rotation of said portions in response to counter-rotative torque on said portions of a magnitude sufficient to overcome said yielding means, a reset cam mounted to a first of said portions of each counting wheel, the simultaneous alignment of all the cams serving to set the counting wheels to a numerical level predetermined by the rotational adjustment between the portions of each of the counting wheels, numerical indicia, a circumferential shoulder, and a zero level notch disposed on each shoulder on the second of said portions of each counting wheel, each notch being similarly disposed with respect to a selected numerical indicia, reset means for simultaneously aligning the cams, said reset means comprising a reset bar pivotally mounted to said case, reset fingers on said reset bar each adapted to engage one of said cams, there being a finger for each cam, and means for pivoting said reset bar to bring the fingers into engagement with the cams for aligning the same, said pivotal arm engaging said reset bar, whereby when the reset means are actuated to bring the reset fingers into contact with said cams, the transfer gears are withdrawn from contact with the counting wheels, actuation means for rotating a first of said counting wheels to cause the counting train to count, said actuation means comprising an armature of magnetic material pivotally mounted to said case, a solenoid mounted to said case spaced from and adapted to attract the armature when energized so as to pivotally move the armature, a yoke and pawl assembly engaging said armature and adapted to rotate one of said counting wheels by one unit actuation in response to one pivtoal movement of the armature caused by a single magnetic impulse provided by the solenoid, and zero level means comprising a pivotally mounted gang bar having contact means aligned with the counting wheel shaft for simultaneously contacting each of said shoulders, whereby said gang bar assumes one position when the counting frame is at any numerical level other than zero as the result of at least one portion of said gang bar contacting an unnotched portion of one of the shoulders, and said gang bar having a second position when the counting train is set at zero as a consequence of every portion of said gang bar contacting a notch, and indicator means responsive to the position of said gang bar to indicate whether the counter is at zero level or not.

2. Apparatus according to claim 1 in which the reset means comprise a solenoid mounted to the case, said solenoid being adapted to actuate said reset means.

3. A counter comprising: a case, a counting wheel shaft mounted to the case and disposed inside the same, a plurality of counting wheels rotatably mounted upon said shaft, each counting wheel having a radix and being rotatable through one full revolution in response to unit actuations equal in number to its radix, a unit actuation thereby turning said counting wheel through an angle equal to 360° divided by its radix, a transfer gearing shaft, an arm pivotally mounted to the case and supporting said transfer gearing shaft so it is movable toward and away from the counting wheels, gear teeth on said counting wheels, a plurality of transfer gears rotatably mounted on said transfer gearing shaft and engageable with the gear teeth on the counting wheels, one of said gears interconnecting a pair of adjacent counting wheels for providing a unit actuation to one wheel of said pair of counting wheels as a consequence of one full revolution of the preceding counting wheel, each counting wheel comprising a driven portion and a follower portion, said portions being coaxially disposed for rotation about the counting wheel shaft, yielding means joining said portions for mutual rotational motion in response to torque exerted on one of said portions, said yielding means permitting counter-rotation of said portions in response to counter-rotative torque on said portions of a magnitude sufficient to overcome said yielding means, a reset cam mounted to a first of said portions of each counting wheel, the simultaneous alignment of all the cams serving to set the counting wheels to a numerical level predetermined by the rotational adjustment between the portions of each of the counting wheels, numerical indicia, a circumferential shoulder, and a zero level notch disposed on each shoulder on the second of said portions of each counting wheel, each notch being similarly disposed with respect to a selected numerical indicia, reset means for simultaneously aligning the cams, said reset means comprising a reset bar pivotally mounted to said case, reset fingers on said reset bar each adapted to engage one of said cams, there being a finger for each cam, and means for pivoting said reset bar to bring the fingers into engagement with the cams for aligning the same, said pivotal arm engaging said reset bar, whereby when the reset means are actuated to bring the reset fingers into contact with said cams, the transfer gears are withdrawn from contact with the counting wheels, actuation means for rotating a first of said counting wheels to cause the counting train to count, said actuation means comprising an armature of magnetic material pivotally mounted to said case, a pair of solenoids, one mounted on each side of the armature and adapted to attract the armature in its direction when energized so as to pivotally move the armature, a yoke, two pawls attached to the yoke, one on each side of the counting train, each thereby being adapted to rotate the counting train in the opposite direction from the other, whereby one solenoid causes subtraction and the other addition, each pawl being adapted to rotate one of said counting wheels by one unit actuation in response to one pivotal movement of the armature caused by a single magnetic impulse provided by the solenoid, and zero level means comprising a pivotally mounted gang bar having contact means aligned with the counting wheel shaft for simultaneously contacting each of said shoulders, whereby said gang bar assumes one position when the counting frame is at any numerical level other than zero as the result of at least one portion of said gang bar contacting an unnotched portion of one of the shoulders, and said gang bar having a second position when the counting train is set at zero as a consequence of every portion of said gang bar contacting a notch, and indicator means responsive to the position of said gang bar to indicate whether the counter is at zero level or not.

4. Apparatus according to claim 1 in which the reset means comprise a solenoid mounted to the case, said solenoid being adapted to actuate said reset means.

(References on following page)

References Cited in the file of this patent

UNITED STATES PATENTS

| | | |
|---|---|---|
| 545,034 | Balzer | Aug. 20, 1895 |
| 2,107,705 | Lang | Feb. 8, 1938 |
| 2,137,013 | Bradley | Nov. 15, 1938 |
| 2,219,636 | Schwartz | Oct. 29, 1940 |
| 2,251,974 | Berck | Aug. 12, 1941 |
| 2,563,668 | Abel | Aug. 7, 1951 |
| 2,764,350 | Braatz | Sept. 25, 1956 |
| 2,769,596 | Loosli | Nov. 6, 1956 |
| 2,781,976 | Hoffmann | Feb. 19, 1957 |
| 2,904,250 | Allebach | Sept. 15, 1959 |
| 2,980,329 | Hoffmann | Apr. 18, 1961 |
| 2,996,241 | Hoffmann | Aug. 15, 1961 |

FOREIGN PATENTS

| | | |
|---|---|---|
| 610,472 | Great Britain | Oct. 15, 1948 |

UNITED STATES PATENT OFFICE
CERTIFICATE OF CORRECTION

Patent No. 3,064,893                          November 20, 1962

Carl E. Grinstead

It is hereby certified that error appears in the above numbered patent requiring correction and that the said Letters Patent should read as corrected below.

Column 8, line 71, for the claim reference numeral "1" read -- 3 --.

Signed and sealed this 7th day of January 1964.

(SEAL)
Attest:

ERNEST W. SWIDER

Attesting Officer

EDWIN L. REYNOLDS

Acting Commissioner of Patents